United States Patent
Pankovcin et al.

(10) Patent No.: US 7,111,075 B2
(45) Date of Patent: Sep. 19, 2006

(54) METHOD AND SYSTEM FOR PROCESSING DATA RECORDS HAVING MULTIPLE FORMATS

(75) Inventors: Igor Pankovcin, Redmond, WA (US); Jason M. Allor, Seattle, WA (US); Daniel C. Patton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 09/739,715

(22) Filed: Dec. 18, 2000

(65) Prior Publication Data

US 2002/0078216 A1 Jun. 20, 2002

(51) Int. Cl.
G06F 15/16 (2006.01)

(52) U.S. Cl. .................................. 709/246; 709/213

(58) Field of Classification Search ............... 709/224, 709/246; 707/101
See application file for complete search history.

(56) References Cited

U.S. PATENT DOCUMENTS

| | | | |
|---|---|---|---|
| 5,200,864 A | 4/1993 | Dunn et al. | |
| 5,274,772 A | 12/1993 | Dunn et al. | |
| 5,335,328 A | 8/1994 | Dunn et al. | |
| 5,384,669 A | 1/1995 | Dunn et al. | |
| 5,414,570 A | 5/1995 | Fry et al. | |
| 5,517,670 A | 5/1996 | Allen et al. | |
| 5,535,335 A | 7/1996 | Cox et al. | |
| 5,539,918 A | 7/1996 | Allen et al. | |
| 5,593,724 A | 1/1997 | Rich et al. | |
| 5,845,283 A * | 12/1998 | Williams et al. | 707/101 |
| 5,946,691 A | 8/1999 | Lee et al. | |
| 5,953,724 A | 9/1999 | Lowry | |
| 5,956,715 A | 9/1999 | Glasser et al. | |
| 6,028,602 A | 2/2000 | Weidenfeller et al. | |
| 6,058,462 A | 5/2000 | West et al. | |
| 6,144,962 A | 11/2000 | Weinberg et al. | |
| 6,147,687 A | 11/2000 | Wanderski | |
| 6,154,748 A | 11/2000 | Gupta et al. | |
| 6,199,099 B1 * | 3/2001 | Gershman et al. | 709/203 |
| 6,230,318 B1 | 5/2001 | Halstead et al. | |
| 6,240,410 B1 | 5/2001 | Wical | |
| 6,308,173 B1 | 10/2001 | Glasser et al. | |
| 6,335,733 B1 | 1/2002 | Keren et al. | |
| 6,411,974 B1 * | 6/2002 | Graham et al. | 715/531 |
| 6,418,446 B1 | 7/2002 | Lection et al. | |
| 6,442,549 B1 * | 8/2002 | Schneider | 707/10 |
| 6,470,388 B1 * | 10/2002 | Niemi et al. | 709/224 |
| 6,515,656 B1 | 2/2003 | Wittenburg et al. | |
| 6,606,649 B1 * | 8/2003 | Schwitters et al. | 709/206 |
| 6,795,809 B1 * | 9/2004 | O'Brien et al. | 705/16 |

* cited by examiner

*Primary Examiner*—Patrice Winder
(74) *Attorney, Agent, or Firm*—Lee & Hayes, PLLC

(57) ABSTRACT

A method and system for processing data records having multiple formats is provided, in which each format to be parsed has a plug-in module associated with it. Each plug-in module has a uniform interface that can be accessed by, for example, a parsing engine or other client. The parsing engine may, in turn, provide services for manipulating data to the plug-in modules in order to assist them in performing their respective tasks. A standard format is provided to allow data from the records to be stored in a database.

20 Claims, 4 Drawing Sheets

METHOD AND SYSTEM FOR PROCESSING DATA RECORDS HAVING MULTIPLE FORMATS

TECHNICAL FIELD

The invention relates generally to the processing of data records, and, more particularly, to parsing data records of multiple formats by using one or more plug-in modules to parse each format.

BACKGROUND OF THE INVENTION

Computer-readable records can be stored in a variety of different ways. For example, they may be stored using unformatted ASCII characters, mark-up language documents, or in one of many proprietary formats. Furthermore, the information within computer-readable records is, itself, subject to many different formats and interpretations. In comparing the patient records of different hospitals, for example, one may find that hospital A puts the patient's blood type in the tenth line of the record, while hospital B puts it in the fifth line. One may also find that, in addition to listing the patient's exact weight, hospital A has a special code to indicate whether the patient is mildly, moderately or morbidly obese, while patient records in hospital B only indicate whether a patient is obese or not. It may be that the data format for hospital A works fine for hospital A, and likewise for hospital B, but if the two hospitals were ever to merge, it would be difficult to consolidate the records of the two hospitals into a single database. It is very likely that all of the old records would have to be converted into a single, standard format.

Another example in which multiple record formats can be troublesome is in the area of software testing. A program with a large code base may require dozens of teams to test the various sections of the code. Software tests are typically performed using one or more software test programs. These programs are designed to run portions of the tested code, simulate a variety of types of input and conditions, and record the results of the test in one or more test logs. If multiple teams are involved, each team may choose to use a different test program than the other teams. This means that each team's test log will be in a different format and possibly contain different information that all of the other teams, making it very difficult to create a single, unified database for holding all of the test results. Although it is possible to force each test team to use a single test program, it is undesirable for at least two reasons: (1) It stifles creativity. Each team should be free to choose the test program that works best for it. (2) The company producing the program may choose to contract out some of the testing. The contractor chosen to perform the testing may have a considerable investment in a particular test program and may not wish to have its choice of program dictated to it, or may charge more for the trouble.

Thus it can be seen that there is a need for a method and system for processing data records having multiple formats that avoids the above-mentioned disadvantages.

SUMMARY OF TILE INVENTION

In accordance with this need, a method and system for processing data records having multiple formats is provided, in which each format to be parsed has a plug-in module associated with it. Each plug-in module has a uniform interface that can be accessed by, for example, a parsing engine or other client. The parsing engine may, in turn, provide services for manipulating data to the plug-in modules in order to assist them in performing their respective tasks. A standard format is provided to allow data from the records to be stored in a database.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The invention is generally directed to a method and system for processing data records of different formats. In an embodiment of the invention, a plug-in module is provided for each format. The plug-in module receives the data from a record as an input, parses the data, converts the data from its original format into a standardized format, and passes the converted data via a standard interface to a database. By using this system, multiple organizations can keep their existing records unchanged, if desired, and simply create a plug-in module that can perform the conversion as needed for storage in a centralized database. The database can then call the appropriate plug-in module when attempting to import a record having a foreign format.

Although it is not required, the invention may be implemented by computer-executable instructions, such as program modules, that are executed by a computer. Generally, program modules include routines, programs, objects, components, data structures and the like that perform particular tasks or implement particular abstract data types.

The invention may be implemented on a variety of types of computers, including personal computers (PCs), handheld devices, multi-processor systems, microprocessor-based on programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
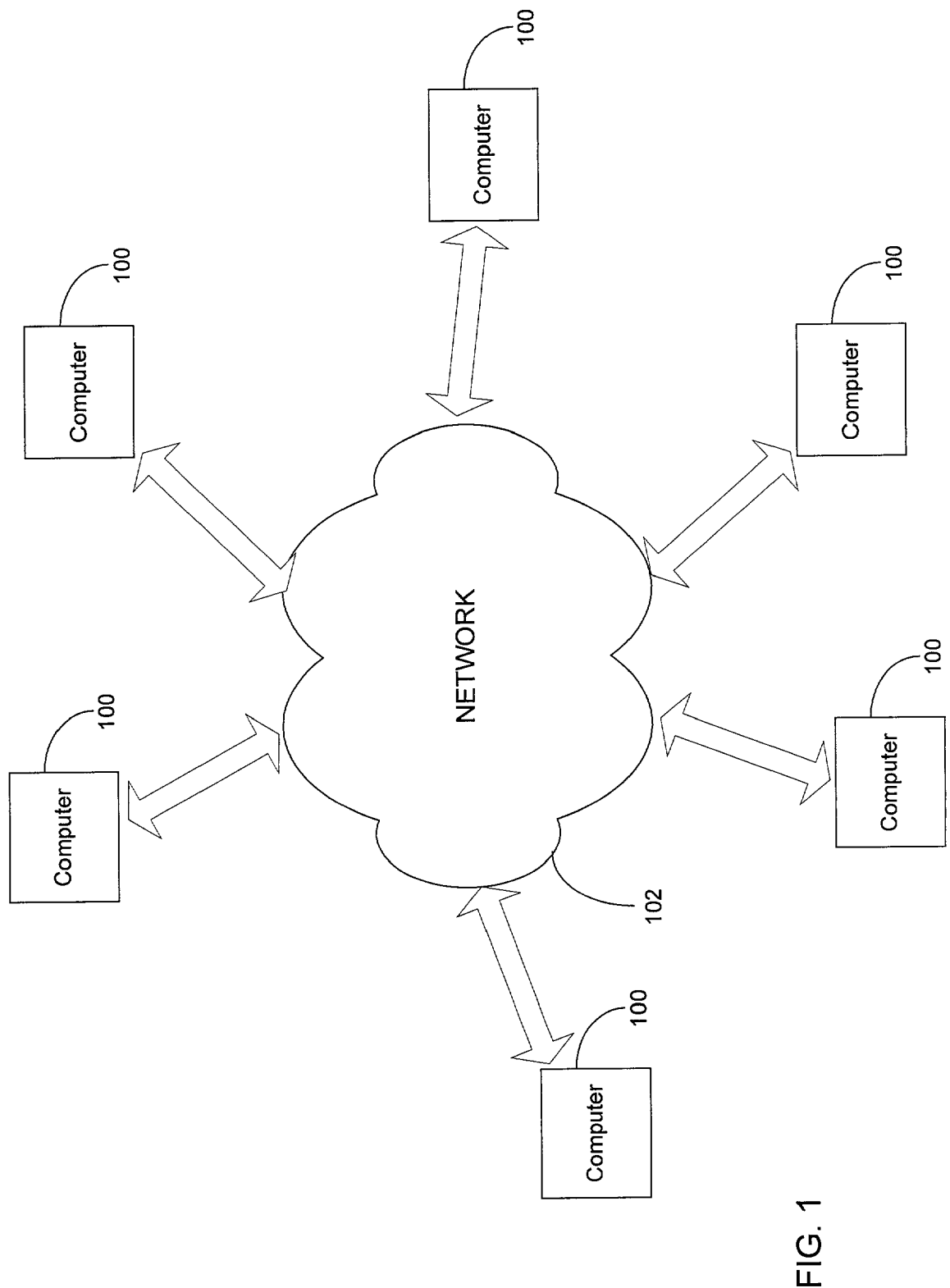
FIG. 1 is an example of a network.

An example of a networked environment in which this system may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
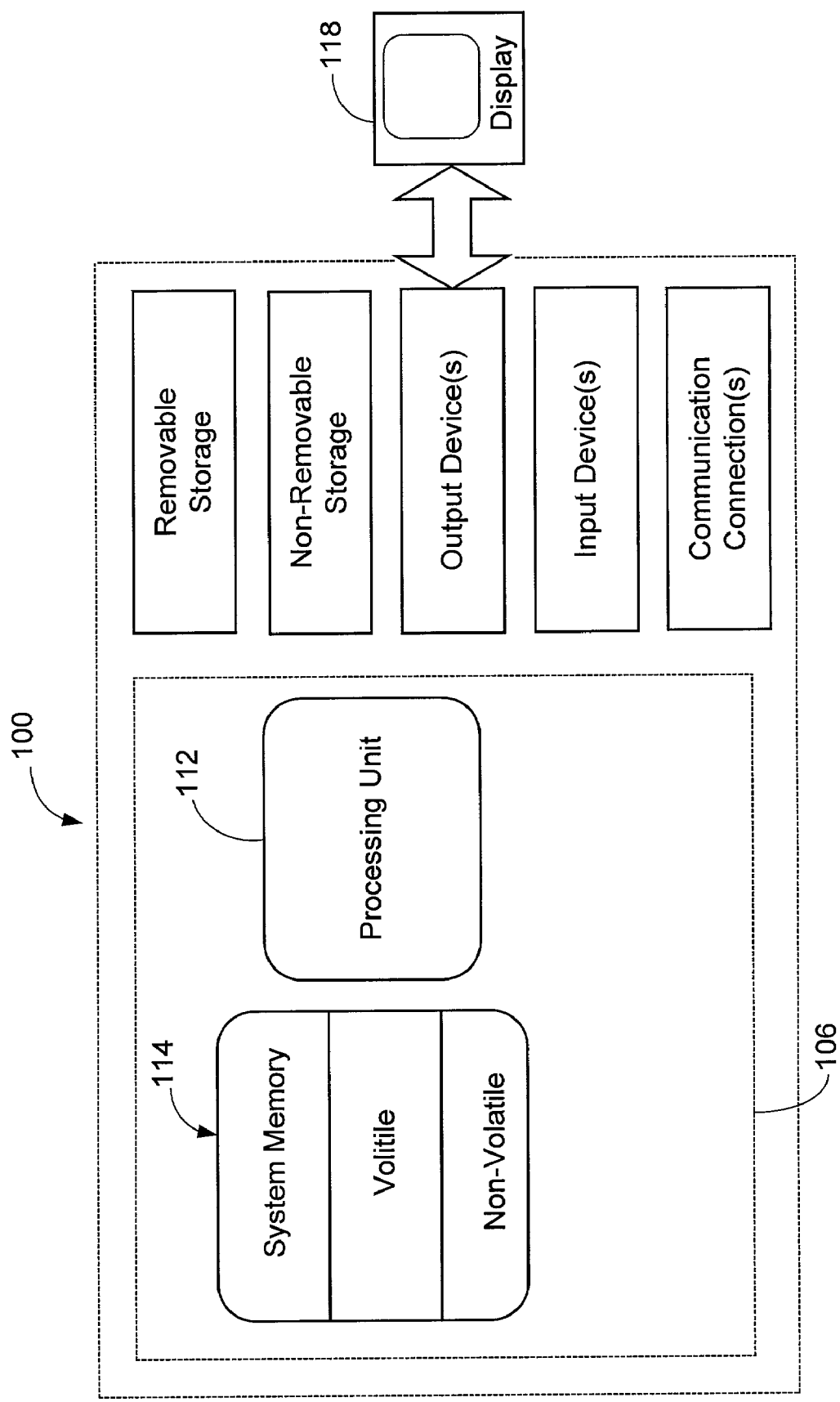
FIG. 2 is an example of a computer.

Referring to FIG. 2, an example of a basic configuration for a computer on which the system described herein may be implemented is shown. In its most basic configuration, the computer 100 typically includes at least one processing unit 1 12 and memory 114. Depending on the exact configuration and type of the computer, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not of limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 118, speakers, a printer, etc. may also be included. All these devices are well known in the art and need not be discussed at length here.

Figure 3:
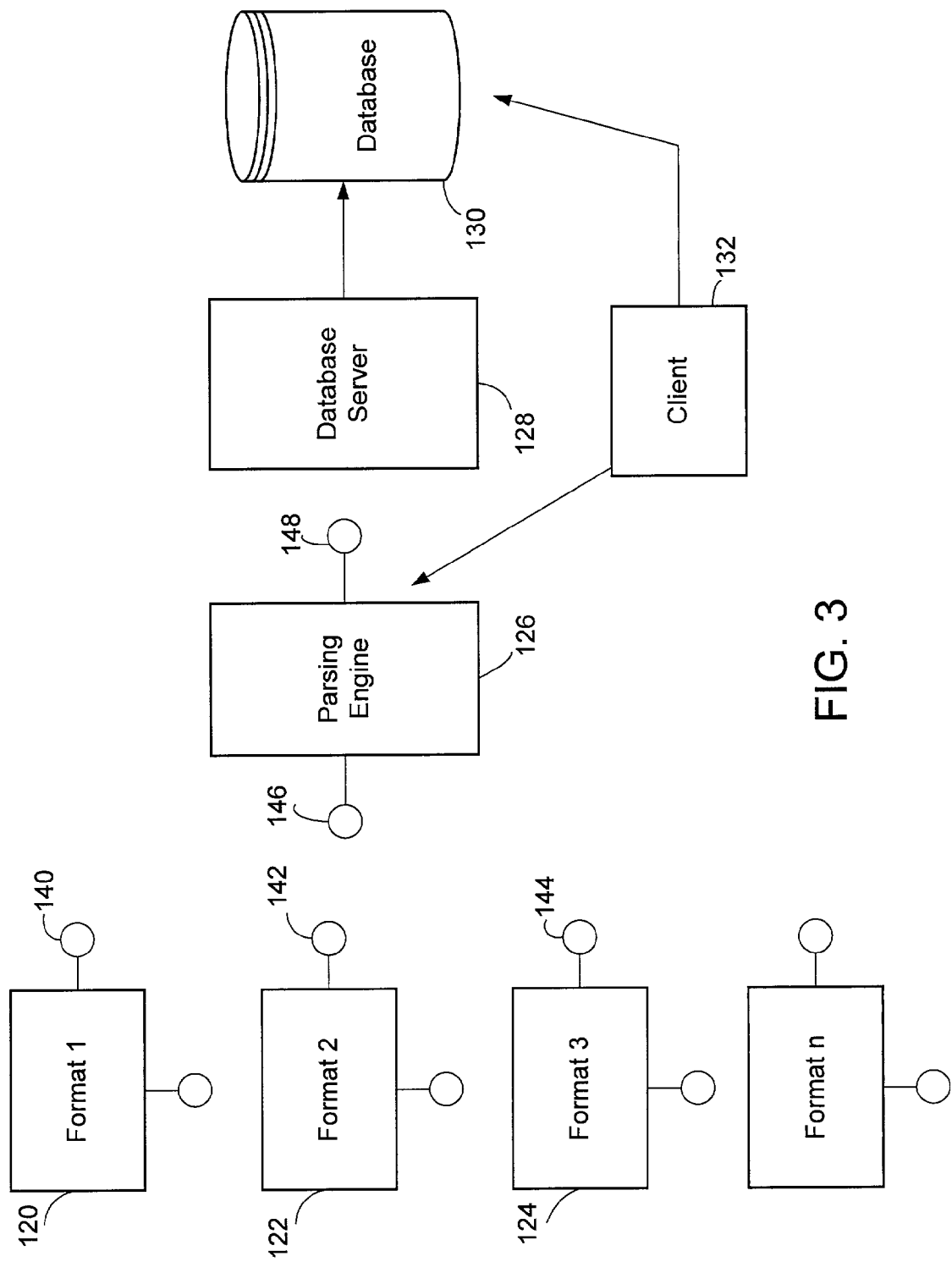
FIG. 3 is an example of a software architecture; and,
FIG. 4 is an example of steps for processing a test log.

The system described here may be implemented in a variety of ways. FIG. 3 shows an example of an architecture that may be used. Plug-in modules 120, 122 and 124 operate to convert data from different formats, labeled format 1, 2 and 3, respectively. Any number of formats may be supported, however, and there may be at least one plug-in module per format. In an embodiment of the invention, the plug-in modules are component object model (COM) object. A parsing engine 126 loads one of the plug-in modules 120, 122 and 124, as needed, and calls functions of the loaded module, via its interface, in order to convert data from formats 1, 2 or 3 into a single, standard format. Each of the plug-in modules 120, 122 and 124 has a respective interface 140, 142 and 144. Although labeled with distinct numbers for convenient reference, each of the interfaces 140, 142 and 144 conforms to a single, uniform specification to allow all of the modules 120, 122 and 124 to communicate with the parsing engine 126 according to standard plug-in or "snap-in" techniques. Implementing the plug-in modules in this manner allows them to be swapped in and out like puzzle pieces. The parsing engine 126 also provides basic services to the plug-in modules, that the plug-in modules may access, if required, through an interface 146. Some of these services will be described below in greater detail.

The parsing engine 126 interacts with a database server 128. The database server 128 maintains a database 130. The database server 128 calls the parsing engine 126 to convert data from one or more data records into a standard format. Calls from the database server 128 to the parsing engine 126 are made through an interface 148. The parsing engine 126 returns results to the database server 128 through the same interface. Once it receives converted data from the parsing engine 126, the database server 128 can store those results in the database 130 in the standard format. Additionally, calls to the parsing engine 126 may be made by other clients, represented in FIG. 3 by a client 132.

In an embodiment of the invention, the parsing engine 126 has two basic sets of functions. The first set includes services that may be called by a plug-in module to assist the plug-in module in its task of converting data. The plug-in modules are under no obligation to use these services. These services include:

(1) OpenFile(FileHandle)

Opens the data record file. The handle points to the location of the file. As will be described below, parsing engine provides the handle.

(2) CloseFile( )

Closes the data record file.

(3) GetNextLine(Length, Line)

Returns the next line from the data record file. Typically, a plug-in module will read each line of the file, one by one, until it finds the line(s) that contain the desired data.

(4) GetPreviousLine(Length, Line)

Returns the previous line from the data record file.

(5) GetNextValue(Line, Index, Value);

Retrieves a specific value from one line of the data record file. For example, if the file is a test log, it may present its result data in the following format: PASS 5 FAIL 3, meaning that three tests failed and 5 passed. The plug-in module will call GetNextLine repeatedly until it comes to this line. Then it will call GetNextValue to retrieve the 5 and the 3.

(6) GetResultsLocationString (Handle, ResultsLocation)

Returns a string that points to the location of the data record. The string can be anything that is meaningful to the calling plug-in module and explains where the data record is stored. This might be a file on a disk, a machine name, a database location, etc.

(7) JumpToStartOfFile( ); JumpToEndOfFile( )

Moves the file pointer to the beginning or end of the file. This may affect what is then returned by GetNextLine or GetPreviousLine.

(8) GetSetupString(Handle, SetupString)

Returns the setup string (if any) that was sent to the parsing engine by the original caller. See the Set SetupString function, below.

It is possible that some of the services described above will be most suitable for text data. Other types of services may be provided for binary or proprietary database records.

The second set of services are generally invoked by the database server 128 or the client 132 via the interface 148 to request data from one or more data records, and having it provided in a standard format. These services include:

(9) Open(FileLocation, ParserCLSID);

Initializes the parsing engine. The first parameter points to the location of the data record file. The architecture is flexible enough so that the log does not have to be a text file, although this is a common format. The results can be stored anywhere, in any format. The ResultsLocation string (see item 6 above) provides information to tell the plug-in module where the data is located. This may be the location of a file on a disk. The second parameter, ParserCSLID contains a GUID (globally unique ID number) that points to the particular plug-in to use to convert data in the data record.

(10) Close( )

This function is called, after all conversion is done, to uninitialize the parser.

As can be seen, the general flow of control starts with either the database server 128 or the client 132, which calls the parsing engine 126 to request data from a record. The parsing engine 126 loads the plug-in module appropriate for the format of the record, and calls plug-in module to perform any necessary parsing and conversion. The plug-in module then calls functions of the parsing engine 126, if necessary, to assist in the conversion process. The plug-in module provides the results to the parsing engine 126, which, in turn provides them to the database server 128 or the client 132.

The invention may be used in a variety of contexts. As discussed in the background, for example, software testing is an area in which there is a high potential for the existence of competing data record formats. Specifically, different test teams may use different test programs, resulting in the creates of different types of test result logs. For example, one result log format may have a single line that indicates whether a test has passed or failed. Another format may have a series of parts for each test, and a separate pass or fail indication for each part. Yet another may have different levels of failure. Different formats may also treat an "abort" differently—some may consider an aborted test to be a pass, while others may consider it a failure. The present invention gives the various test teams a tool by which standard test result records may be created. Each team can keep its preferred test program and test result format for internal use, and simply write a plug-in module according to a well-defined specification, as described above, to convert the test result data into a single, standard format that is understood organization-wide.

When the invention is used in the context of software testing, one implementation of the parsing engine 128 of FIG. 3 provides the services 1-10 described above. Additionally, it may provide the following services to either the database server 128 or the client 132:

(11) GetResultPassFail(Result)

Returns a flag that tells whether the test passed or failed.

(12) GetResultString(ResultString)

Creates a friendly text string that can be used to display the results data to the user.

(13) GetResultComplete(Pass, Fail, Warn, Block, Abort)

Returns the complete raw results data, which can then be stored in the database.

(14) SetSetupString(SetupString)

Allows the caller to set an initialization string, that can later be retrieved by the plug-in module. This allows one plug-in module to act in two or more different modes, which can be activated depending upon the contents of the setup string.

The first time one of functions 11–13 is called, the parsing engine 126 loads the correct plug-in module. The plug-in module parses the file and returns the raw results. Once the parsing engine 126 has these raw results, it does not need to call the parser plug-in to parse the log again. If any subsequent calls are made to one of the three GetResult . . . functions, it uses the raw results data that it already has obtained. As with functions 8–10, functions 11–14 are called via the interface 148.

To parse test result logs and convert the result data into a standard format, each of the plug-in modules 120, 122 and 124 may, in an embodiment of the invention, implement the following function:

(15) ParseLogResults(LogHandle, Pass, Fail, Warn, Block, Abort, AltResult)

The first parameter, LogHandle is a handle that is provided by the parsing engine 126. This handle is used if the plug-in wants to make use of the parser services provided by the interface 146. If the plug-in does not need to use these services, it does nothing with this handle.

The next five parameters, Pass, Fail, Warn, Block, and Abort, each receives the results data once it has been parsed out of the log file. The plug-in module returns the number of tests that passed, the number that failed, the number of warnings that occurred, the number of tests that could not be run because of some external situation (Block), and the number of tests that were aborted by the user. These five types of data are useful in the software testing context because they provide the types of data that are most commonly returned by software tests. Additionally, the AltResult parameter offers the possibility of additional types of results.

It is anticipated that many test logs won't express their results using Pass, Fail, Warn, Block, and Abort. Thus, it is the job of the plug-in modules handling such logs to insure that the test result data is converted in such a way that it can be expressed using these categories, so that the raw data can be passed to the parsing engine 126. The parsing engine 126 then formats the raw results so that they can be stored in the database. This technique helps achieve a standard test result format across the entire organization.

Figure 4:
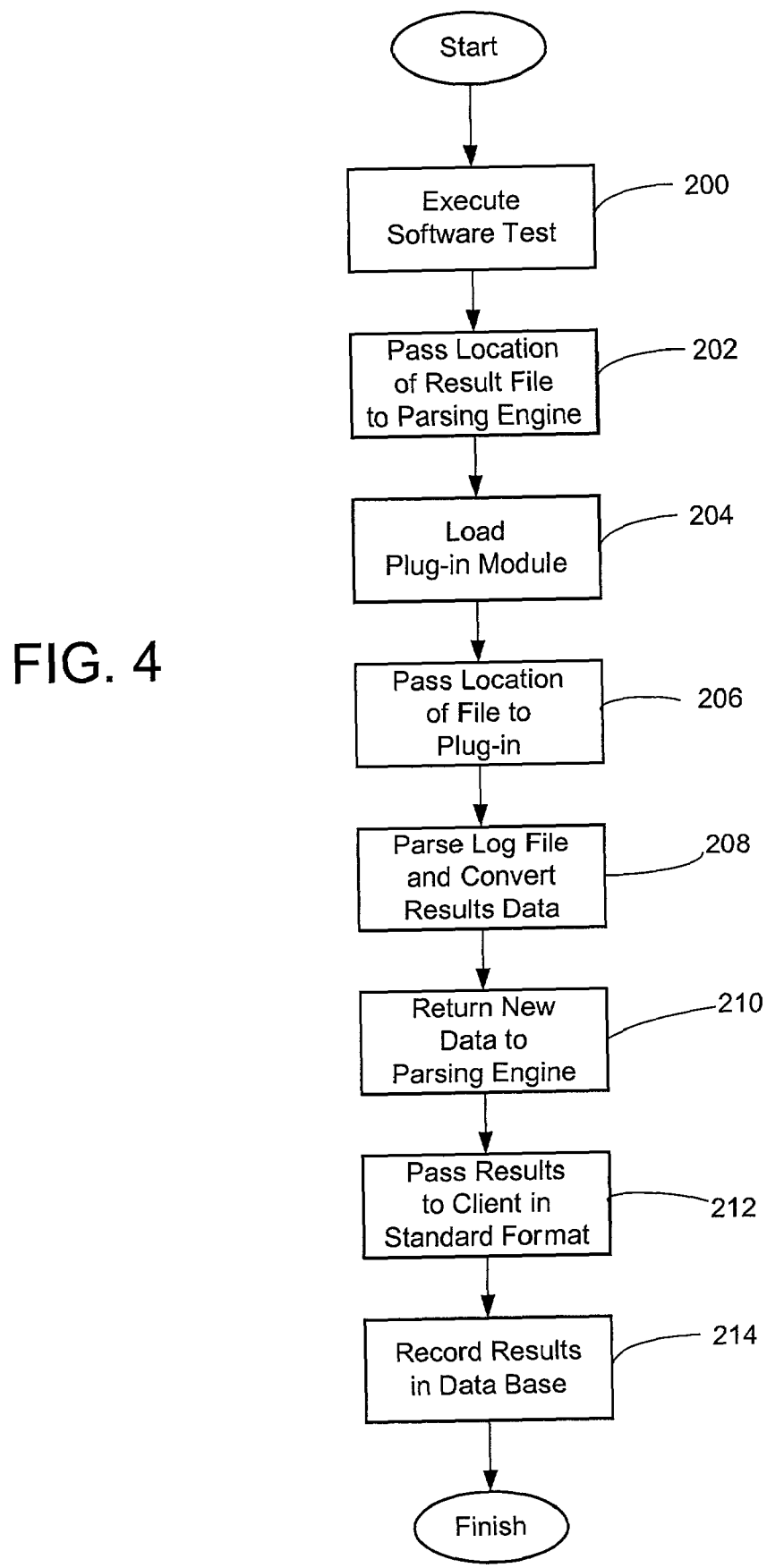

Referring to the diagram of FIG. 3 and the flowchart of FIG. 4, an example of the steps followed to create and parse a test log file according to an embodiment of the invention will now be described. At step 200, the client 132 executes a software test, and produces a test log that is stored as a file on the client's hard drive. It is assumed for the purpose of this example that the test log is in format #2. At step 202, the client calls the OpenFile function via the interface 148, and passes the location of the file and the file type to the parsing engine 126. The parsing engine 126 then loads the plug-in module 122 at step 204. At step 206, the parsing engine 126 calls the ParseLogResults function of plug-in module 122 via the interface 142, and sends the location of the log file as part of the LogHandle parameter. At step 208, the plug-in module 122 parses the data in the log file and converts the results from their original format and categories into a simple tally of "Passes," "Fails," "Warnings," "Blocks," and "Aborts." This conversion may involve for example—converting multiple failure levels—Failure 1, Failure 2, Failure 3—into a single failure level. The plug-in module then returns the raw data to the parsing engine 126 at step 210. At step 212, the parsing engine returns the results to the client 132 in the standard format. For example, the parsing engine 126 may convert "Blocks" and "Aborts" to "Passes," and "Warning" to "Fails." The result passed to the client 132 may then be the one with the highest total—i.e. more "Fails" than "Passes" is an overall "Fail." The client 132 then records the result in the database 130 in the standard format. The process is then complete.

It can thus be seen that a new and useful method and system for processing data records having multiple formats has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method for processing data records of multiple formats, the method comprising:
   providing by a parsing engine a uniform interface for multiple plug-in modules, wherein each plug-in module is adapted to parsing at least one of the multiple formats and to converting data contained in the data records from a non-standard format into a standard format;
   parsing, by the multiple plug-in modules, the data records into results in accordance with at least two of the multiple formats;
   converting, by the multiple plug-in modules, the data records from a non-standard format into a standard format; and
   receiving at the parsing engine the results of parsing and converting operations from the multiple plug-in modules through the uniform interface.

2. A computer-readable medium having stored thereon computer-executable instructions for performing the method of clam 1.

3. The method of claim 1, further comprising:
   providing by the parsing engine services for manipulating data from the data records, wherein the services are invokable by the multiple plug-in modules to assist the multiple plug-in modules to performing their tasks.

4. The method of claim 3, wherein the services include a service to retrieve a line of text.

5. The method of claim 1, further comprising:
   forwarding from the parsing engine the parsed results in the converted standard format for storage in a database.

6. A computer-readable medium having stored thereon computer-readable data comprising: plug-in module adapted to parsing at least one data record format for parsing data records into results in accordance with the at least one data record format and converting the data contained in the data records from a non-standard format into a standard format and passing the converted data through a uniform interface to a parsing engine so that it can be stored in a database;
   wherein the plug-in module is capable of being loaded by the parsing engine when a data record of the at least one data record format is to be parsed and converted.

7. The computer-readable medium of claim 6, wherein the plug-in module is adapted to parsing one particular data record format.

8. The computer-readable medium of claim 6, wherein the plug-in module is a COM object.

9. A method for converting data from a non-standard format to a standard format, the method comprising:
   retrieving the data from a record;
   loading for a parsing engine plug-in module adapted to parsing at least one data record format;
   parsing the data, using the plug-in module, to determine its contents, wherein the parsing is performed in accordance with the at least one data record format;
   resolving inconsistencies between the data and the standard format, using the plug-in module, to convert the data to the standard format; and,
   passing the converted data from the plug-in module through a standard interface to the parsing engine for storage in a database in the standard format.

10. A computer-readable medium having stored thereon computer-executable instructions for performing the method of claim 9.

11. The method of claim 9, wherein the record is a log record and the data is converted into a standard log format.

12. The method of claim 9, wherein the retrieving further comprises: calling auxiliary services from the parsing engine to retrieve the data from the record.

13. A method for converting a test log into a standard format, the method comprising:
   loading for a parsing engine a log parser plug-in module to interpret the test log, wherein the plug-in module is adapted to parsing at least one test log format and to converting log data into the standard format;
   parsing, by the plug-in module, the test log in accordance with the at least one test log format to determine its contents;
   converting, by the plug-in module, the test log into the standard format; and,
   passing the converted data from the plug-in module through a standardized interface to the parsing engine for storage in a database in the standard format.

14. A computer-readable medium having stored thereon computer executable instructions for performing the method of claim 13.

15. The method of claim 13, further comprising:
   converting a variety of types of PASS results contained in the test log into a single PASS category.

16. The method of claim 13, farther comprising:
   converting a variety of types of FAIL results contained in the test log into a single FAIL category.

17. The method of claim 13, farther comprising:
   tallying all PASS results to determine an overall PASS result according to the standard format.

18. The method of claim 13, farther comprising:
   tallying all FAIL results to determine an overall FAIL result according to the standard format.

19. A system for converting test logs of a variety of test log formats into a single test log format, the test logs containing software test results, the system comprising:
   a plurality of log parser plug-in modules, wherein each log parser plug-in module is adapted for parsing test logs of one of the variety of test log formats and for converting test log data into the single test log format, and wherein each log parser plug-in module includes an interface conforming to the single test log format;
   a log parser engine for loading a correct log parser plug-in module for a given test log format, and for calling the interface of the loaded log parser plug-in module to parse the test logs in accordance with the one of the variety of test log formats and to obtain the converted test log data in the single test log format from the loaded log parser plug-in module; and,
   a database for storing the converted test log data in the single test log format so that the software test results are accessible to multiple users.

20. A system for converting test logs of a variety of test log formats into a single test log format, the test logs containing software test results, the system comprising:
    means for parsing test logs of one of the variety of test log formats and for converting test log data into the single test log format;
    means for loading the means for parsing test logs that is correct for a given test log format;
    means for providing the converted test log data in the single test log format to the means for loading; and,
    a database for storing the converted test log data in the single test log format so that the software test results are accessible to multiple users.

* * * * *